Patented Apr. 20, 1943

2,316,847

UNITED STATES PATENT OFFICE 2,316,847

PRODUCTION OF ORGANIC COMPOUNDS CONTAINING INORGANIC GROUPS

Henry Dreyfus, London, England, assignor to Celanese Corporation of America, a corporation of Delaware No Drawing. Application February 12, 1941, Serial No. 378,653. In Great Britain March 8, 1940

3 Claims. (Cl. 260—513)

This invention relates to the production of organic compounds containing inorganic groups and is more particularly concerned with the production of sulpho-carboxylic acids and salts and halides thereof.

According to the invention, a sulpho-carboxylic acid or a salt or halide thereof is produced by a process comprising replacing, in halogenated aliphatic nitriles, a halogen atom by a sulphonic grouping and transforming the nitrile group into a carboxy group. This method of producing sulpho-carboxy compounds has great practical value since it has been found possible to effect the transformation of the nitrile group during the introduction of the sulphonic group, thus avoiding a separate operation for this step and considerably simplifying the manufacture of the desired sulpho-carboxy compound.

A most important embodiment of the invention is the production of sulpho-carboxy compounds from omega-halogen aliphatic nitriles and especially omega-monochloraliphatic nitriles, e. g. the omega-monochlor-propio-, n-butyro-, n-valero- and n-capro-nitriles. There may also be employed as starting materials in the process, halogenated nitriles containing side chains, e. g. alkyl-substituted derivatives of the nitriles mentioned above, and also halogenated nitriles in which halogen is attached to a carbon atom within the chain. It is to be noted that the nitrile used need contain no more than a single atom of chlorine or other halogen.

The replacement of the halogen atom by a sulphonic group may be effected directly by means of an agent such as a sulphite, and especially an alkali sulphite. Both normal sulphites, e. g. sodium or ammonium sulphite and acid sulphites, e. g. sodium bisulphite, may be used.

The reaction can be carried out by heating a mixture of the halogenated nitrile with an aqueous solution of the sulphite to a temperature which should be above about 80° C. and can very conveniently be the boiling point of the aqueous solution. The halogenated nitrile and sulphite solution can be mixed and then heated with stirring to the reaction temperature, or the sulphite solution can be heated to the reaction temperature and the halogenated nitrile then added slowly and with continuous agitation, e. g. by stirring or by the vigorous boiling of the sulphite solution. If desired the speed of the reaction can be increased by employing a reaction temperature above the normal boiling point of the sulphite solution, this result being achieved by carrying out the reaction under super-atmospheric pressure.

It is preferred to employ somewhat more of the sulphite than is theoretically required, for instance, a quantity equal to 2–3 or even more, e. g. 4, molecules of sulphite for each molecule of halogenated nitrile. The sulphite employed need not all be dissolved and indeed, with a sulphite having a relatively low solubility, e. g. sodium bisulphite, complete solution might necessitate the use of an inconveniently large volume of water; in this case there may be employed a suspension of the sulphite in its saturated solution.

Where a sulphonic acid salt is produced by such a process the free acid may be obtained by acidification of the salt solution with a strong acid. In this connection it is to be noted that in presence of free acid, e. g. when converting a sodium or other metal sulphonate to the sulphonic acid or even when introducing the sulphonic group with the aid of aqueous bisulphite, the nitrile group is converted at high temperatures, for instance, in the neighbourhood of 100° C. into the carboxy group. Thus, simply boiling the product obtained by treatment of a halogenated nitrile with a sulphite with water in the presence of free acid produces a sulpho-carboxylic acid, a mineral acid such as sulphuric acid or hydrochloric acid being most suitable for this purpose.

The sulphonic grouping can also be introduced by first forming an S-alkyl isothiourea salt and reacting this product with a halogen, the halogen atom in the halogenated aliphatic nitrile thus being transformed into a sulpho-halide grouping. Such a process may be carried out by reacting the halogenated aliphatic nitrile with thiourea itself, or with an N-substituted thiourea containing at least one hydrogen atom attached to a nitrogen atom, by heating the reagents, preferably in presence of a liquid diluent, to a temperature of about 100° C. or somewhat higher, e. g. up to 150° C. and thereafter reacting with a halogen the S-alkyl isothiourea hydrohalide salt formed. Excellent results are obtained by adding finely powdered thiourea to an omega-chloraliphatic nitrile mixed with a hydrocarbon diluent and heated to the reaction temperature and continuing the addition of the thiourea until there has been added about the quantity theoretically required to form the S-alkyl isothiourea hydrochloride. The product obtained after distillation of the diluent present, is mixed with water and subjected to reaction with chlorine, most conveniently by passing chlorine through the mixture until no more chlorine is absorbed; this is shown by the development of the characteristic greenish colour of chlorine water.

The reaction between chlorine or other halogen and isothiourea salts takes place over quite a wide range of temperature and while it can be carried out very effectively over a range of temperature extending from well below room temperature up to 50° C. or even higher, the use of relatively low temperatures, e. g. between 5 and 25° C., avoids any danger of the sulphonyl chloride produced being hydrolysed immediately to the sulphonic acid. When this precaution is taken the sulphonyl chloride, being insoluble in water, forms a separate phase and can be separated from the reaction medium before being subjected to hydrolysis in a separate operation to produce the sulphonic acid. The product obtained is the sulpho-carboxylic acid, the nitrile grouping having been hydrolysed to a carboxylic grouping.

Having described my invention, what I desire to secure by Letters Patent is:

1. In a process for the manufacture of a sulpho-carboxylic acid, the steps of heating together in a liquid medium an omega-monohalogen aliphatic nitrile and a thiourea containing at least one hydrogen atom attached to the nitrogen atom, reacting with halogen the S-alkyl isothiourea formed whereby there is obtained an aliphatic nitrile containing an omega-sulphonyl halide group, and then hydrolyzing the nitrile and sulphonyl halide groups in said aliphatic nitrile to form a sulpho-carboxylic acid.

2. In a process for the manufacture of a sulpho-carboxylic acid, the steps of heating together in a liquid medium an omega-chlorinated aliphatic nitrile and thiourea, reacting with chlorine S-alkyl isothiourea formed whereby there is obtained an aliphatic nitrile containing an omega-sulphonyl chloride group, and then hydrolyzing the nitrile and the sulpho-chloride groups in said aliphatic nitrile to form a sulpho-carboxylic acid.

3. A process according to claim 1 wherein the omega-chlorinated aliphatic nitrile is omega-chlor-n-butyro nitrile.

HENRY DREYFUS.